United States Patent
Sakai et al.

(10) Patent No.: US 10,953,922 B2
(45) Date of Patent: Mar. 23, 2021

(54) VEHICLE BODY FRONT STRUCTURE

(71) Applicant: HONDA MOTOR CO., LTD., Tokyo (JP)

(72) Inventors: Kazuhiro Sakai, Wako (JP); Kosuke Matsushita, Wako (JP); Hiroshi Imanishi, Wako (JP); Takehiko Koshiishi, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 78 days.

(21) Appl. No.: 16/580,257

(22) Filed: Sep. 24, 2019

(65) Prior Publication Data

US 2020/0102013 A1 Apr. 2, 2020

(30) Foreign Application Priority Data

Sep. 27, 2018 (JP) .............................. JP2018-182594

(51) Int. Cl.
| | | |
|---|---|---|
| *B62D 21/02* | (2006.01) | |
| *B62D 3/12* | (2006.01) | |
| *B60G 3/04* | (2006.01) | |
| *B62D 21/11* | (2006.01) | |
| *B60G 7/00* | (2006.01) | |
| *B62D 7/16* | (2006.01) | |
| *B62D 21/06* | (2006.01) | |

(52) U.S. Cl.
CPC .............. *B62D 21/02* (2013.01); *B60G 3/04* (2013.01); *B60G 7/001* (2013.01); *B62D 3/12* (2013.01); *B62D 7/16* (2013.01); *B62D 21/06* (2013.01); *B62D 21/11* (2013.01)

(58) Field of Classification Search
CPC . B62D 21/02; B62D 3/12; B62D 7/16; B62D 2/11; B62D 21/155; B60G 2204/143; B60G 2204/15
USPC .................................................. 280/124.109
See application file for complete search history.

(56) References Cited

U.S. PATENT DOCUMENTS

| | | | |
|---|---|---|---|
| 6,109,631 A * | 8/2000 | Jones ...................... | B60G 3/20 |
| | | | 280/124.134 |
| 2004/0046348 A1* | 3/2004 | Lee ........................ | B62D 21/11 |
| | | | 280/124.134 |

(Continued)

FOREIGN PATENT DOCUMENTS

JP 5372130 B2 12/2013

*Primary Examiner* — Paul N Dickson
*Assistant Examiner* — Mary E Young
(74) *Attorney, Agent, or Firm* — Armstrong Teasdale LLP

(57) ABSTRACT

A vehicle body front structure includes: a front subframe; left and right suspension lower arms swingably supported by the front subframe; and a steering gearbox supported by the front subframe. The front subframe includes left and right longitudinal members extending in a fore-and-aft direction, a cross member extending laterally and joined to the longitudinal members, and a front lower arm support and a rear lower arm support provided on each longitudinal member to be spaced from each other in the fore-and-aft direction and swingably supporting the corresponding lower arm. The steering gearbox includes a laterally extending rack shaft and a pair of joints provided at either end of the rack shaft and joined to ends of respective tie rods. The longitudinal members extend obliquely so as to approach each other toward rear, and each front lower arm support is positioned more rearward than the steering gearbox.

8 Claims, 8 Drawing Sheets

(56) References Cited

U.S. PATENT DOCUMENTS

| | | | |
|---|---|---|---|
| 2017/0349215 A1* | 12/2017 | Isakiewitsch | B62D 21/11 |
| 2018/0273088 A1* | 9/2018 | Offerle | B62D 25/00 |
| 2018/0273094 A1* | 9/2018 | Komiya | B62D 7/163 |
| 2020/0102012 A1* | 4/2020 | Sakai | B62D 7/16 |
| 2021/0024135 A1* | 1/2021 | Okamoto | B62D 21/155 |

* cited by examiner

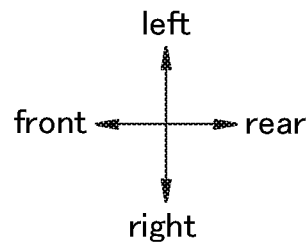
*Fig.1*
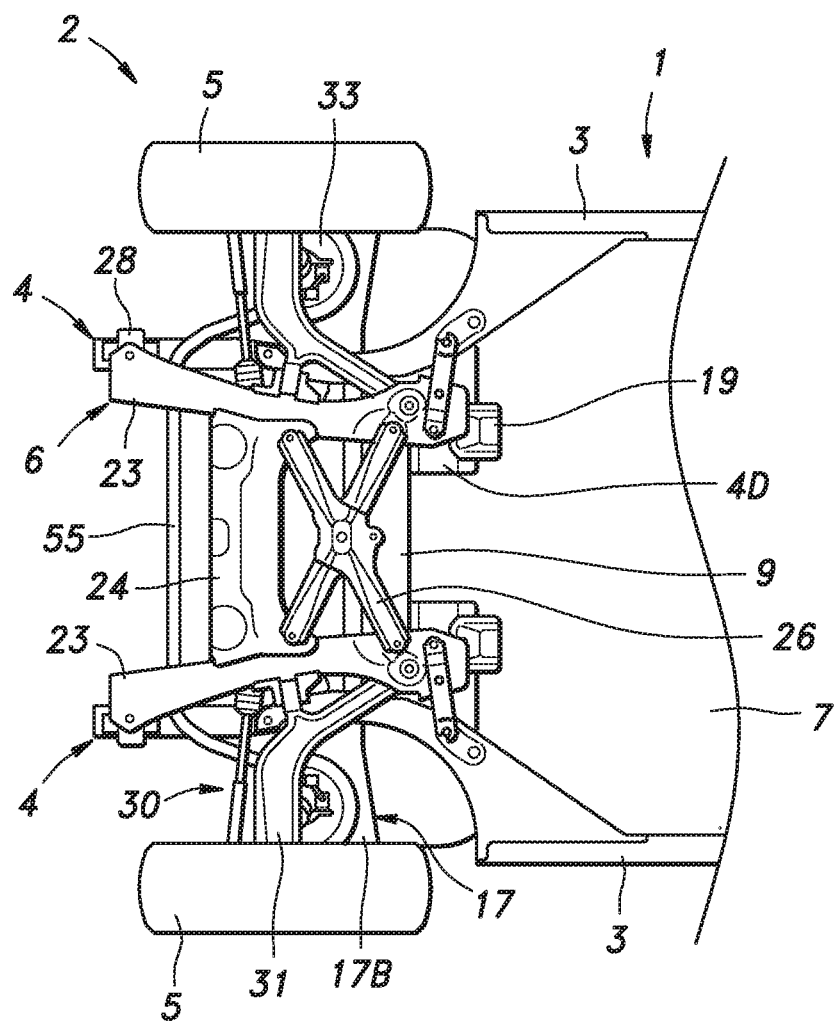

VEHICLE BODY FRONT STRUCTURE

TECHNICAL FIELD

The present invention relates to a vehicle body front structure including a front subframe.

BACKGROUND ART

As a vehicle body front structure of a four-wheel vehicle, there is known a structure including a pair of left and right front side frames extending in the fore-and-aft direction and a front subframe attached to the underside of the front side frames (see JP5372130B2, for example). The front subframe supports the arms of the suspensions for suspending the front wheels, the steering gearbox, and the driving source, such as an internal combustion engine or an electric motor.

To enlarge the steering range of the front wheels, it is necessary to enlarge the spaces formed on either lateral side of the front subframe in which the front wheels are steered. For this purpose, it is necessary to arrange the suspension arms and the steering gearbox relative to the front subframe so as not to interfere with the front wheels.

SUMMARY OF THE INVENTION

In view of the above background, a primary object of the present invention is to provide a vehicle body front structure including a front subframe that can enlarge the steering range of the front wheels.

To achieve the above object, one embodiment of the present invention provides a vehicle body front structure (1), comprising: a front subframe (6); a pair of left and right lower arms (31) swingably supported by the front subframe, each lower arm being a part of a corresponding suspension (30); and a steering gearbox (40) supported by the front subframe, wherein the front subframe includes a pair of left and right longitudinal members (23) extending in a fore-and-aft direction, a cross member (24) extending laterally and joined to the longitudinal members, and a front lower arm support (36) and a rear lower arm support (51) provided on each longitudinal member to be spaced from each other in the fore-and-aft direction and swingably supporting the corresponding lower arm, the steering gearbox includes a laterally extending rack shaft (42) and a pair of joints (44) provided at either end of the rack shaft and joined to ends of respective tie rods (43), the longitudinal members extend obliquely so as to approach each other toward rear, and the front lower arm supports are positioned more rearward than the steering gearbox.

Thereby, spaces can be formed on laterally outer sides of the steering gearbox so that the steering range of the front wheels can be enlarged.

Preferably, in plan view, a front end of each front lower arm support is positioned more forward than a rear end of the cross member, and a rear end of each front lower arm support is positioned more rearward than a front end of the cross member.

Thereby, the front lower arm supports are arranged at positions overlapping the cross member in the lateral direction. This allows the lateral force input from each lower arm to the corresponding front lower arm support to be efficiently transmitted to the cross member so that the deformation of the longitudinal members is suppressed.

Preferably, each front lower arm support is joined to the corresponding longitudinal member and the cross member.

Thereby, the lateral force input from each lower arm to the corresponding front lower arm support can be efficiently transmitted to the cross member, and the deformation of the longitudinal members can be suppressed.

Preferably, each lower arm is supported by the corresponding rear lower arm support at a rear end thereof and includes an arm rear part (31A) extending from the rear end forward and laterally outward in an oblique manner, an arm curved part (31B) that is laterally curved from a front end of the arm rear part, and an arm front part (31C) extending laterally outward from a laterally outer end of the arm curved part and supporting a knuckle (32) at a tip end thereof, and each front lower arm support supports the corresponding lower arm at the arm curved part.

Thereby, large spaces in which the front wheels are steered can be formed in front of the arm front parts of the respective lower arms.

Preferably, the arm front part has a width larger than those of the arm rear part and the arm curved part.

Thereby, it is possible to improve the stiffness of a part of each lower arm where the largest lateral force from the corresponding front wheel is applied.

Preferably, the arm curved part is formed such that a front edge thereof has a curvature smaller than a curvature of a rear edge thereof.

Thereby, each lower arm can have a width that increases from the arm rear part to the arm curved part. Thereby, the stiffness of the arm curved part is improved, and the lower arm can be made resistant to deformation under the lateral force applied from the corresponding front wheel.

Preferably, the joint is positioned on an extension line obtained by extrapolating the corresponding arm front part in a lengthwise direction when the rack shaft is in a neutral position. It is also preferred that, in plan view, a laterally outer edge of each longitudinal member is curved such that a fore-and-aft central part thereof is recessed laterally inward.

Thereby, large spaces in which the front wheels are steered can be formed on laterally outer sides of the respective longitudinal members.

Thus, according to one embodiment of the present invention, there is provided a vehicle body front structure including a front subframe that can enlarge the steering range of the front wheels.

BRIEF DESCRIPTION OF THE DRAWINGS

FIG. 1 is a bottom view of a vehicle body structure according to an embodiment of the present invention;

DESCRIPTION OF THE PREFERRED EMBODIMENT(S)

In the following, a vehicle body structure according to an embodiment of the present invention will be described. In the following description, the fore-and-aft direction, the lateral direction (vehicle widthwise direction), and the vertical direction are defined with respect to the vehicle. "Laterally inward (vehicle widthwise inner side)" indicates a direction toward the center of the vehicle in the lateral direction, and "laterally outward (vehicle widthwise outer side)" indicates a direction away from the center of the vehicle in the lateral direction. The frames, panels, and other members constituting the vehicle body structure are made of steel unless otherwise mentioned.

Figure 2:
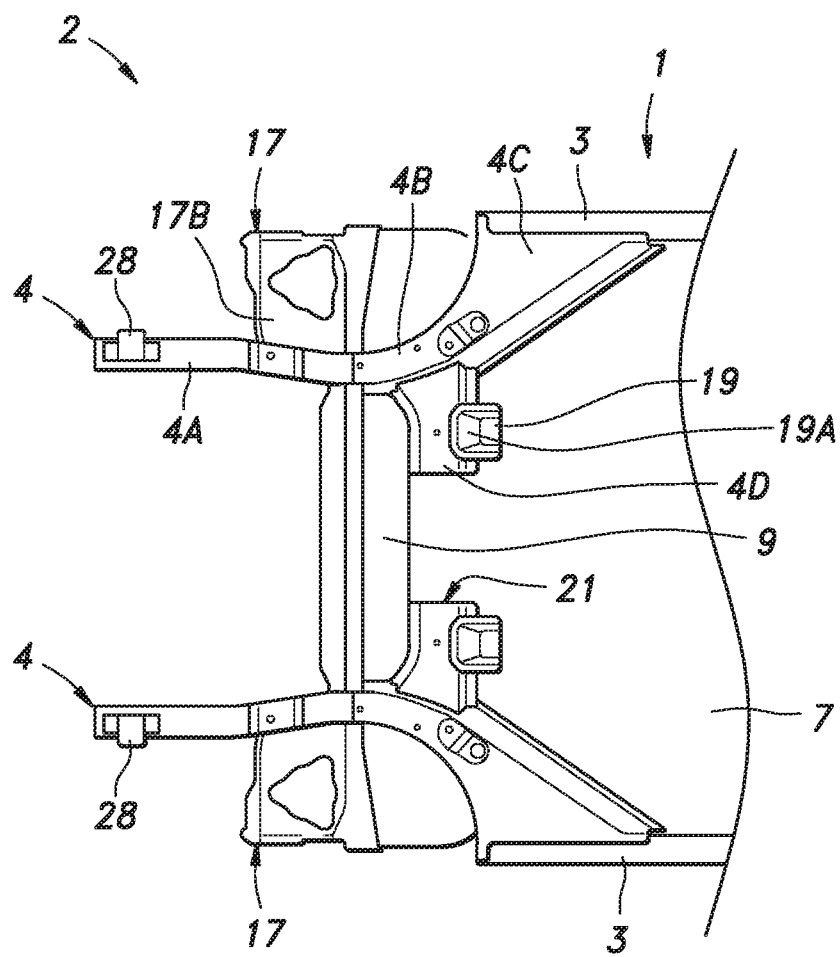
FIG. 2 is a bottom view of the vehicle body structure with a front subframe and a rear subframe being omitted.

As shown in FIGS. 1 and 2, the vehicle body structure 1 includes a pair of left and right side sills 3 extending in the fore-and-aft direction on either lateral side of a lower part of the vehicle 2, a pair of left and right front side frames 4 extending in the fore-and-aft direction in a front part of the vehicle 2 and having rear ends connected to the front ends of the respective side sills 3, and a front subframe 6 attached to the underside of the front side frames 4 and supporting front wheels 5.

Figure 3:
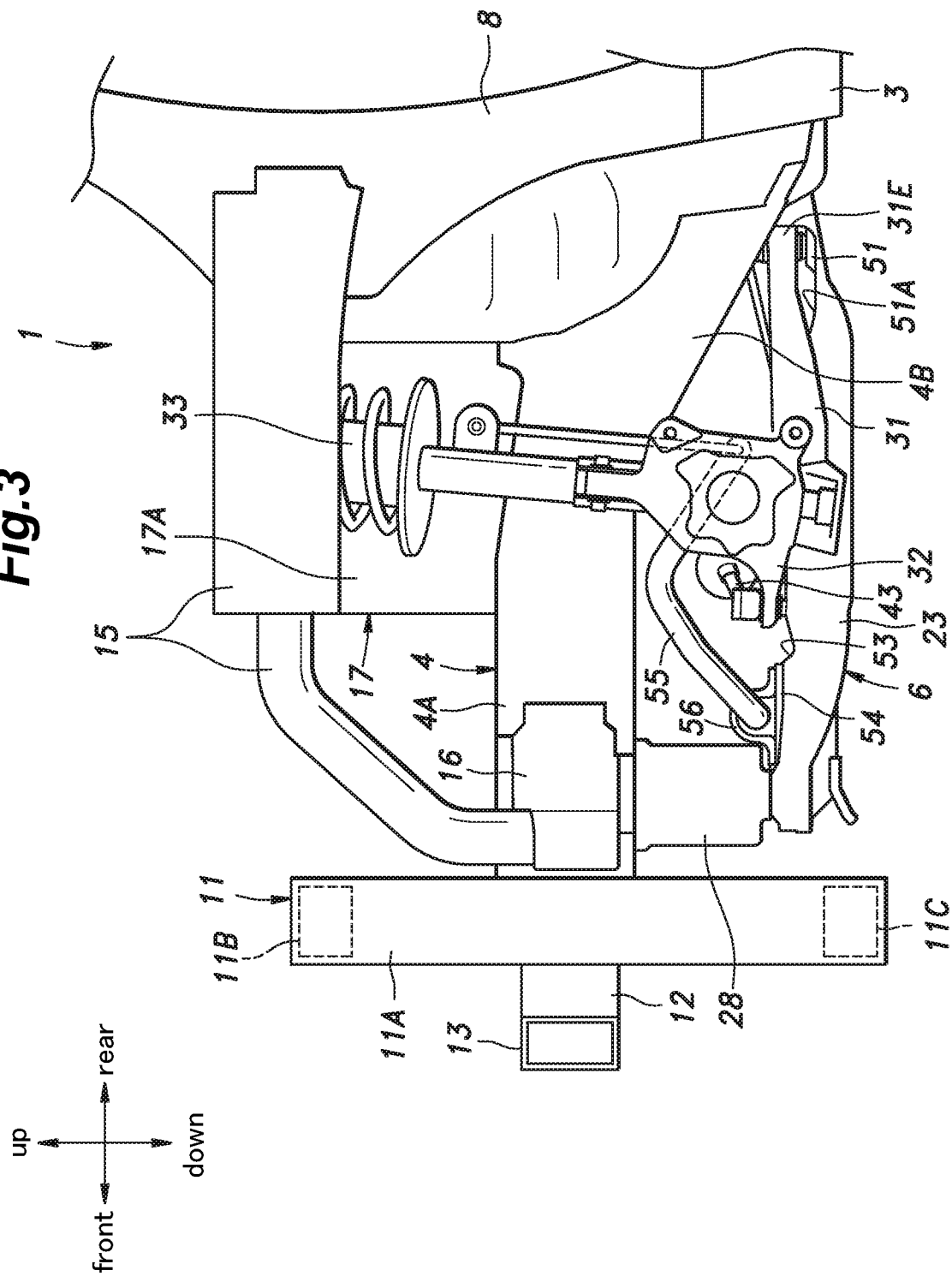
FIG. 3 is a side view of a front part of the vehicle body structure.

A front floor panel 7 is provided on the upper side of the left and right side sills 3 so as to extend between the side sills 3 and has a vertically facing surface. As shown in FIG. 3, a pair of left and right front pillars 8 are provided at the front ends of the left and right side sills 3, respectively. Each front pillar 8 extends vertically and has a lower end joined to the front end of the corresponding side sill 3. As shown in FIGS. 1 and 2, a dash panel 9 is provided between the left and right front pillars 8 so as to have a surface facing in the fore-and-aft direction. The dash panel 9 has left and right side edges joined to the left and right front pillars 8, respectively, and has a lower edge joined to a front edge of the front floor panel 7.

As shown in FIGS. 1 to 4, the left and right front side frames 4 includes front side frame front parts 4A extending in the fore-and-aft direction at positions laterally inward of and above the left and right side sills 3, front side frame middle parts 4B extending rearward and downward from the rear ends of the respective front side frame front parts 4A, and the front side frame inclined parts 4C (outriggers) extending rearward and laterally outward from the rear ends of the respective front side frame middle parts 4B and connected to the front ends of the corresponding side sills 3.

Each front side frame middle part 4B has a hat-shaped cross-section opening upward and is joined to a front face of a lower part of the dash panel 9 so as to form a closed section structure in cooperation with the dash panel 9. Each front side frame inclined part 4C has a hat-shaped cross-section opening upward and is joined to a lower surface of the front floor panel 7 so as to form a closed section structure in cooperation with the front floor panel 7. Each front side frame inclined part 4C has a fore-and-aft width that increases gradually toward the laterally outward direction and has a laterally outer end joined to a laterally inner surface of the corresponding side sill 3.

As shown in FIG. 3, a bulkhead 11 is provided at the front ends of the front side frame front parts 4A. The bulkhead 11 includes a pair of left and right bulkhead side members 11A extending vertically, a bulkhead upper member 11B extending laterally and connecting the upper ends of the left and right bulkhead side members 11A, and a bulkhead lower member 11C extending laterally and connecting the lower ends of the left and right bulkhead side members 11A, whereby the bulkhead 11 is formed in a rectangular frame shape. The front end of each front side frame front part 4A is joined to a vertically middle part of a rear surface of the corresponding bulkhead side member 11A.

A front bumper beam 13 extending laterally is attached to the left and right bulkhead side members 11A via left and right front crash boxes 12 serving as shock-absorbing members, respectively. Each front crash box 12 is formed in a tubular shape extending in the fore-and-aft direction, having a rear end joined to a vertically middle part of the corresponding bulkhead side member 11A, and having a front end joined to a rear side of the front bumper beam 13. The front crash boxes 12 have fore-and-aft stiffness lower than that of the front side frames 4, the front bumper beam 13, and the bulkhead 11, and when a load in a frontal collision is applied thereto, undergoes deformation earlier than the front side frames 4, the front bumper beam 13, and the bulkhead 11 to absorb the impact.

An upper part of each front pillar 8 is provided with a front upper member 15 which extends forward and then extends forward and downward. Each front upper member 15 is positioned laterally outward and above the corresponding front side frame front part 4A. The front end of each front upper member 15 is joined to the front end portion of the corresponding front side frame front part 4A via a laterally extending connecting member 16. Further, a front damper housing 17 is provided between the front side frame front part 4A and the front upper member 15 on each lateral side. Each front damper housing 17 includes a vertical wall 17A extending upward from a rear part of the front side frame front part 4A and an upper wall 17B extending laterally outward from an upper end of the vertical wall 17A and having a laterally outer end joined to the front upper member 15.

Figure 4:
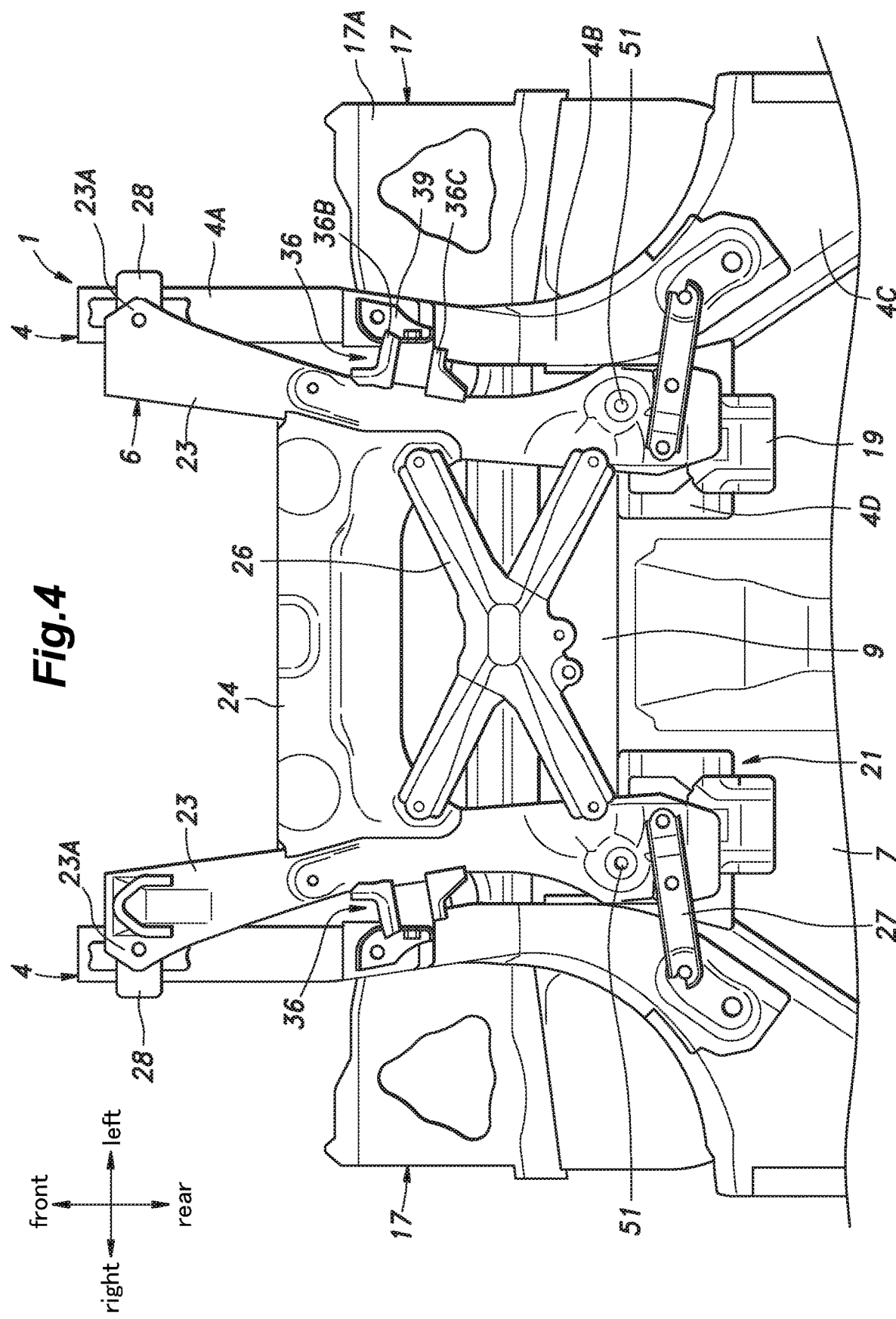
FIG. 4 is a bottom view of the front part of the vehicle body structure.

As shown in FIG. 4, each of the left and right front side frame middle parts 4B is provided with a lateral extension 4D that extends laterally. The laterally inner ends of the left and right lateral extensions 4D laterally oppose each other via a gap. The laterally outer end of each of the left and right lateral extensions 4D is joined to an inner surface of the corresponding front side frame middle part 4B. Each lateral extension 4D has a hat-shaped cross-section opening upward and forms a closed section structure in cooperation with the front floor panel 7. Each lateral extension 4D constitutes a part of the corresponding front side frame 4.

Figure 7:
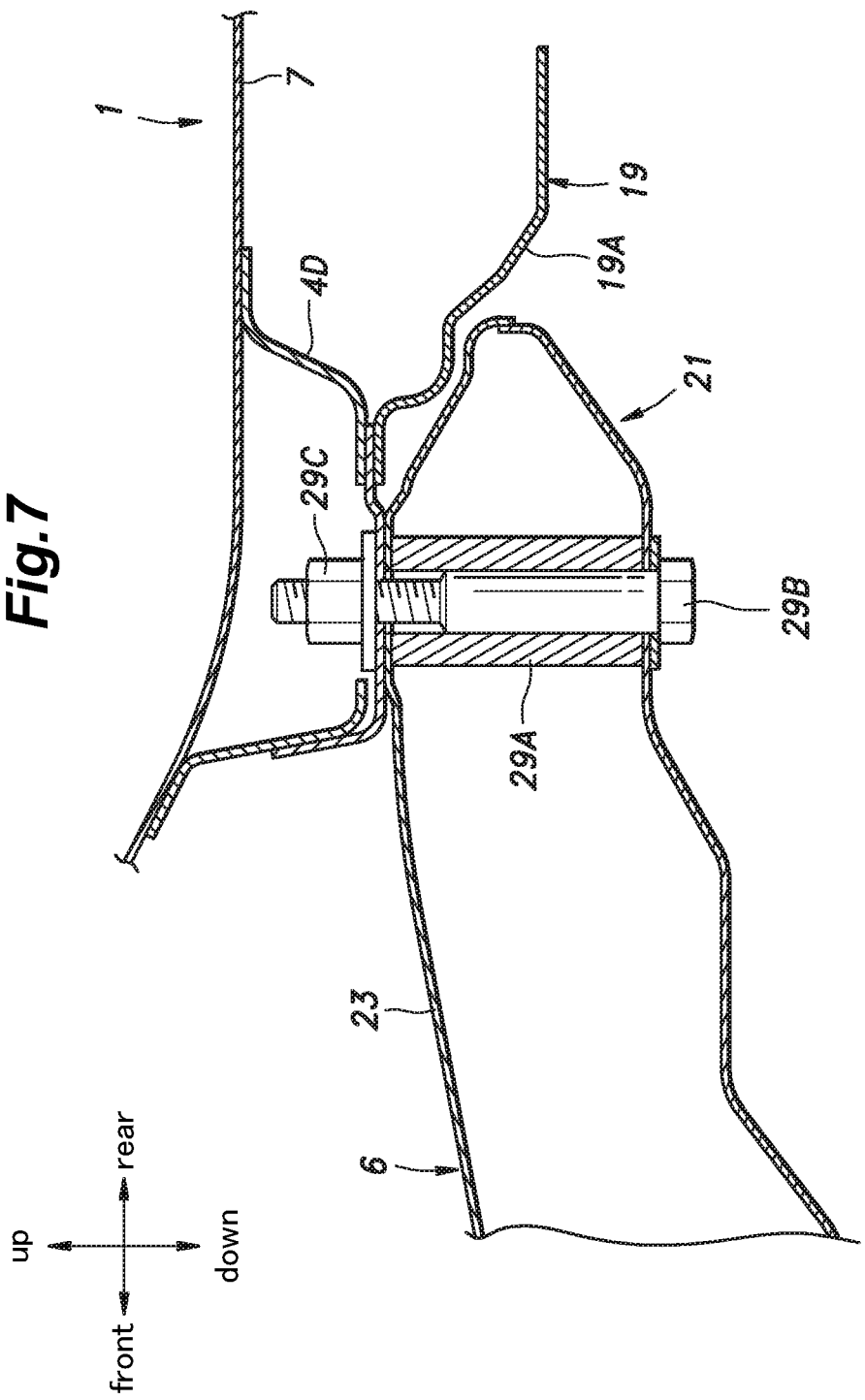
FIG. 7 is a sectional view showing a fastening structure between a rear end portion of a front longitudinal member of the front subframe and a rear-end support.

As shown in FIGS. 4 and 7, a guide member 19 is provided on a laterally inner end of each lateral extension 4D. Each guide member 19 extends rearward from the lower surface of the laterally inner end of the corresponding lateral extension 4D. The guide member 19 is provided, in a front lower part thereof, with a slanted surface 19A that is slanted downward toward the rear. Each lateral extension 4D and the corresponding guide member 19 constitute a rear-end support 21 that supports the rear end of the front subframe 6. Each lateral extension 4D serves as a fastening seat to which the rear end of the front subframe 6 is fastened.

Figure 5:
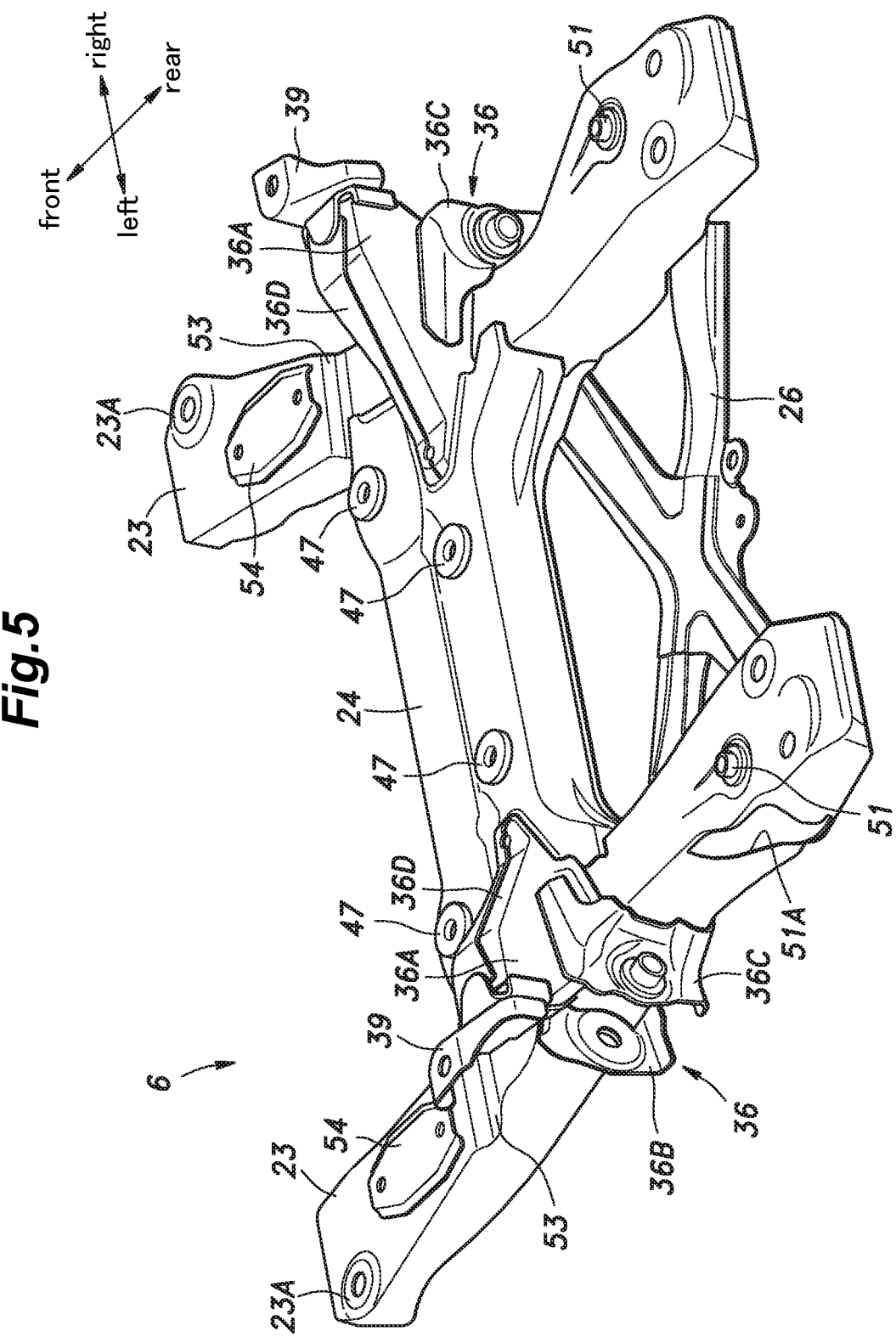
FIG. 5 is a perspective view of the front subframe.

As shown in FIGS. 4 and 5, the front subframe 6 includes a pair of left and right front longitudinal members 23 extending in the fore-and-aft direction and a front cross member 24 extending laterally to be joined to each of the front longitudinal members 23. The left and right front longitudinal members 23 extend obliquely laterally inward toward the rear such that the distance therebetween decreases toward the rear. Further, the laterally outer edge of each front longitudinal member 23 is curved such that the fore-and-aft central part thereof is recessed laterally inward.

The left and right end portions of the front cross member 24 are respectively joined to fore-and-aft middle portions of the front longitudinal members 23. The left and right end portions of the front cross member 24 are respectively joined to portions of the front longitudinal members 23 slightly forward of the fore-and-aft centers thereof. The front longitudinal members 23 and the front cross member 24 each have a closed cross-section. The front edge (front end) of the front cross member 24 is formed laterally straight. The rear edge of the front cross member 24 has left and right end portions extending rearward and laterally outward in an oblique manner. Thereby, the front cross member 24 has a fore-and-aft width that increases gradually toward the laterally outward direction.

Behind the front cross member 24, a brace 26 is provided which extends laterally to connect the left and right front longitudinal members 23. The brace 26 has an X shape in plan view and includes portions extending from the central part thereof in the front left direction, front right direction, rear left direction, and rear right direction. The front left and right end portions of the brace 26 are joined to the left and right ends of the front cross member 24, respectively, and the rear left and right end portions of the brace 26 are joined to the left and right front longitudinal members 23, respectively. The brace 26 is preferably formed of a steel sheet having a vertically facing surface.

As shown in FIG. 4, the front end of each front longitudinal member 23 is positioned below the corresponding front side frame front part 4A to be slightly offset from the same laterally inward. Specifically, a laterally outer part of the front end of the front longitudinal member 23 is positioned to overlap a laterally inner part of the front end the front side frame front part 4A in plan view. Each front longitudinal member 23 includes, in the front end portion thereof, a front end attachment portion 23A attached to the corresponding front side frame 4. The front end attachment portion 23A is provided in a laterally outer part of the front end of the front longitudinal member 23. The front end attachment portion 23A of each front longitudinal member 23 and the front end of the corresponding front side frame front part 4A are connected to each other by a front connecting member 28 that extends vertically. Specifically, each front longitudinal member 23 is fastened to the lower end of the corresponding front connecting member 28 by a bolt passed therethrough from below. Each front connecting member 28 constitutes a front-end support that supports the front end of the front subframe 6. In the present embodiment, the front end attachment portion 23A is attached to the front side frame front part 4A indirectly via the front connecting member 28. In another embodiment, the front end attachment portion 23A may be attached to the front side frame front part 4A directly without the front connecting member 28 interposed therebetween.

The rear end of each front longitudinal member 23 is positioned below the corresponding lateral extension 4D. Namely, the rear end of each front longitudinal member 23 is positioned more laterally inward than the corresponding front side frame middle part 4B. As shown in FIG. 7, the rear end of each front longitudinal member 23 is provided with a collar 29A that vertically extends therethrough. The rear end of the front longitudinal member 23 is fastened to the lower surface of the lateral extension 4D by a bolt 29B passed through the collar 29A from below and threadably engaged with a nut 29C joined to the lateral extension 4D. The rear end of the front longitudinal member 23 protrudes more rearward than the lateral extension 4D, and the rear edge thereof extends laterally. Further, the rear end of the front longitudinal member 23 is provided with a vertical width (vertical thickness) that decreases gradually toward the rear.

The rear end of the front longitudinal member 23 opposes the slanted surface 19A of the guide member 19 via a gap in the fore-and-aft direction. Further, in plan view, the rear end of the front longitudinal member 23 is positioned to overlap the slanted surface 19A of the guide member 19.

As shown in FIG. 4, the lower surface of each rear end of the front longitudinal member 23 is connected to the lower surface of the corresponding front side frame middle parts 4B by a plate-shaped connecting member 27. The connecting member 27 deforms when applied with a load equal to or greater than a predetermined load to release the connection between the front longitudinal member 23 and the front side frame middle part 4B.

Figure 8:
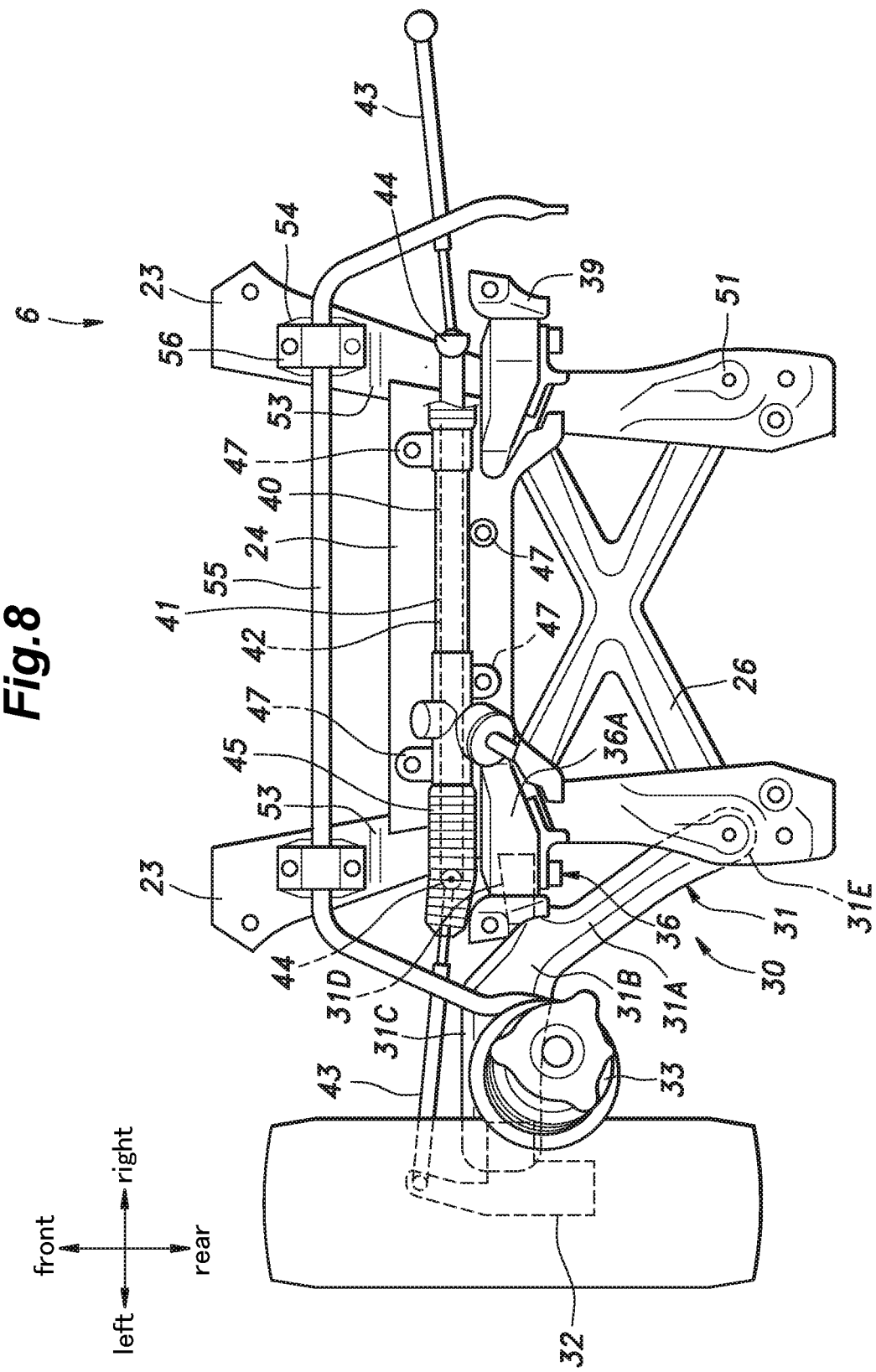
FIG. 8 is a plan view showing the front subframe.

As shown in FIGS. 1 and 8, a pair of left and right front suspensions 30 is provided such that each front suspension 30 is connected to the front subframe 6 and the corresponding one of the left and right front side frames 4. Each front suspension 30 includes a lower arm 31 swingably supported by the corresponding front longitudinal member 23, a front knuckle 32 supported by the lower arm 31, and a front shock absorber 33 connecting an upper part of the front knuckle 32 and the upper wall 17B of the corresponding front damper housing 17.

Each lower arm 31 is a so-called A-arm and includes an arm rear part 31A extending from the rear end forward and laterally outward in an oblique manner, an arm curved part 31B that is curved laterally outward from the front end of the arm rear part 31A, and an arm front part 31C extending laterally outward from the laterally outer end of the arm curved part 31B and supporting the front knuckle 32 at the tip end thereof. The arm front part 31C is formed to have a width larger than those of the arm rear part 31A and the arm curved part 31B. On a laterally inner side of the arm curved part 31B, a front pivotal support portion 31D is provided to protrude laterally. The front pivotal support portion 31D has an axis that extends in the fore-and-aft direction. The rear end of the arm rear part 31A is provided with a rear pivotal support portion 31E having a vertically extending axis.

As shown in FIG. 4, each of the left and right front longitudinal members 23 is provided with a front lower arm support 36 that supports the front pivotal support portion 31D of the lower arm 31 and a rear lower arm support 51 that supports the rear pivotal support portion 31E of the lower arm 31.

Each front lower arm support 36 is disposed to be generally aligned with the front cross member 24 laterally, namely, each front lower arm support 36 is disposed at a position overlapping the front cross member 24 in side view and is joined to the corresponding front longitudinal member 23 and the front cross member 24.

As shown in FIG. 5, each front lower arm support 36 includes a base portion 36A extending laterally above the corresponding front longitudinal member 23 and joined to the front longitudinal member 23 and the front cross member 24, and front and rear support walls 36B, 36C each joined to the base portion 36A and the front longitudinal member 23 and protruding laterally outward from the laterally outer surface of the front longitudinal member 23.

The base portion 36A is formed in a hollow shape by combining a front member and a rear member and is joined to an upper surface and a laterally inner surface of the front longitudinal members 23 and an upper wall of the front cross member 24. The laterally inner end of the base portion 36A extends through the upper wall of the front cross member 24 formed in a hollow shape and extends to the interior of the front cross member 24. The base portion 36A extends from the upper surface of the front longitudinal member 23 upward and laterally outward and forms a laterally outer end portion. The laterally outer end portion of the base portion 36A is positioned more laterally outward than the laterally outer surface of the front longitudinal member 23.

The laterally outer end portion of the base portion 36A is joined to the lower surface of the front side frame front part 4A via a bracket 39. The bracket 39 includes an upper plate portion fastened to the lower surface of the front side frame front part 4A by a vertically extending bolt, and a vertical plate portion depending from a laterally inner end of the upper plate portion. The vertical plate portion of the bracket 39 contacts a laterally outward-facing end surface of the laterally outer end portion of the base portion 36A and is fastened to the laterally outer end portion of the base portion 36A by a laterally extending bolt.

An upper part of the base portion 36A forms a slanted portion 36D (connecting portion) that is slanted upwardly from a laterally inner end portion to a laterally outer end portion thereof. Namely, the slanted portion 36D extends in a slanted manner from the front cross member 24 to the front side frame front part 4A.

Each of the front and rear support walls 36B, 36C is a plate-like member having a surface facing in the fore-and-aft direction and has a laterally inner edge welded to the laterally outer side of the front longitudinal member 23. The rear support wall 36C is positioned behind the front support wall 36B via a gap. An upper part of the laterally inner edge of the front support wall 36B extends to above the front longitudinal member 23 and is welded to the front face of the base portion 36A. An upper part of the laterally inner edge of the rear support wall 36C extends to above the front longitudinal member 23 and is welded to the rear face of the base portion 36A. A lower part of the laterally inner edge of each of the front and rear support walls 36B, 36C extends to under the front longitudinal member 23 and is welded to the lower surface of the front longitudinal member 23.

As shown in FIG. 8, the front pivotal support portion 31D of the lower arm 31 is positioned between the front and rear support walls 36B, 36C. The front pivotal support portion 31D of the lower arm 31 is fitted with a rubber bushing (not shown in the drawings), and a support shaft (not shown in the drawings) is supported on the front and rear support walls 36B, 36C so as to extend in the fore-and-aft direction through the rubber bushing.

As described above, the front lower arm support 36 includes the base portion 36A and the front and rear support walls 36B, 36C and swingably supports the front pivotal support portion 31D of the lower arm 31. The front lower arm support 36 is welded to the front longitudinal member 23 and the front cross member 24 and is fastened to the front side frame front part 4A via the bracket 39.

As shown in FIG. 4, it is preferred that, in plan view, the front support wall 36B forming the front end of the front lower arm support 36 is positioned more forward than the rear end of the lateral end portion of the front cross member 24, and the rear support wall 36C forming the rear end of the front lower arm support 36 is positioned more rearward than the front end of the front cross member 24. In other words, preferably, the front lower arm support 36 overlaps the front cross member 24 in side view. In the present embodiment, the front support wall 36B (the front end of the front lower arm support 36) is positioned more rearward than the front end of the front cross member 24 and the rear support wall 36C (the rear end of the front lower arm support 36) is positioned more forward than the rear end of the front cross member 24.

As shown in FIG. 8, a steering gearbox 40 is provided on the upper surface of the front cross member 24. The steering gearbox 40 includes a laterally extending cylindrical rack housing 41. Inside the rack housing 41, a rack shaft 42 is provided to be laterally slidable relative to the rack housing 41. The left and right end portions of the rack shaft 42 laterally protrude from the rack housing 41 and are connected to the left and right front knuckles 32 via respective tie rods 43. The rack shaft 42 and each tie rod 43 are connected by a joint 44, which may be a ball joint, for example. The left and right joints 44 are arranged in respective boots 45 which are attached to the left and right ends of the rack housing 41, respectively.

At four positions of the front cross member 24; namely, in lateral end portions of the front part of the front cross member 24 and in portions of the rear part of the front cross member 24 located laterally inward of the laterally inner end portions of the base portions 36A of the left and right front lower arm supports 36, collars 47 are provided such that each collar 47 vertically extends through the front cross member 24 and is welded to the upper wall and the lower wall of the front cross member 24. The two collars 47 on the rear side are positioned more laterally inward than the two collars 47 on the front side.

The lateral end portions of the front part of the rack housing 41 are fastened to the front-side left and right collars 47 provided in the front cross member 24 by means of bolts. The rear part of the rack housing 41 is fastened to one of the rear-side left and right collars 47 provided in the front cross member 24 by means of a bolt. The shape of the rack housing 41 varies depending on the lateral position of the steering shaft, and one of the rear-side collars 47 to which the rack housing 41 is fastened is selected in accordance with the shape of the rack housing 41. Thus, the rack housing 41 is fastened to the front cross member 24 at three positions.

The front edge (front end) of each front lower arm support 36 is positioned more rearward than the front edge (front end) of the front cross member 24. The laterally inner end portion of the slanted portion 36D of each base portion 36A is positioned laterally outward of (to the side of) the upper end of the corresponding rear-side collar 47.

Each rear lower arm support 51 is provided in a part of the corresponding front longitudinal member 23 between the front lower arm support 36 and the rear end of the front longitudinal member 23 fastened to the lateral extension 4D. The rear lower arm support 51 has an opening 51A (see FIGS. 5 and 6) formed in a laterally outer face of the front longitudinal member 23 and a support shaft (not shown in the drawings) provided in a deeper side of the opening 51A and extending vertically to be joined to the upper and lower walls of the front longitudinal member 23. The rear pivotal support portion 31E of each lower arm 31 is fitted with a rubber bushing (not shown in the drawings) through which the support shaft is passed. The rear pivotal support portion 31E of the lower arm 31 is allowed to move relative to the rear lower arm support 51 by deformation of the rubber bushing. Thereby, each lower arm 31 is swingably supported to the front subframe 6 by the front lower arm support 36 and the rear lower arm support 51.

As shown in FIG. 4, in bottom view (or in plan view), the rear lower arm support 51 on the left side is positioned on an extension line obtained by extending the left rear end portion of the brace 26. Also, in plan view, the rear lower arm support 51 on the right side is positioned on an extension line obtained by extending the right rear end portion of the brace 26. The rear lower arm supports 51 are positioned more laterally inward than the respective front lower arm supports 36. Further, the rear lower arm supports 51 are also positioned more laterally inward than the left and right joints 44, respectively.

Each front lower arm support 36 is positioned more rearward than the steering gearbox 40. Each arm front part 31C may extend slightly obliquely rearward toward the laterally outward direction, and the joint 44 on the same lateral side may be provided such that the joint 44 is positioned on an extension line obtained by extrapolating the arm front part 31C in the lengthwise direction when the steering is neutral.

Figure 6:
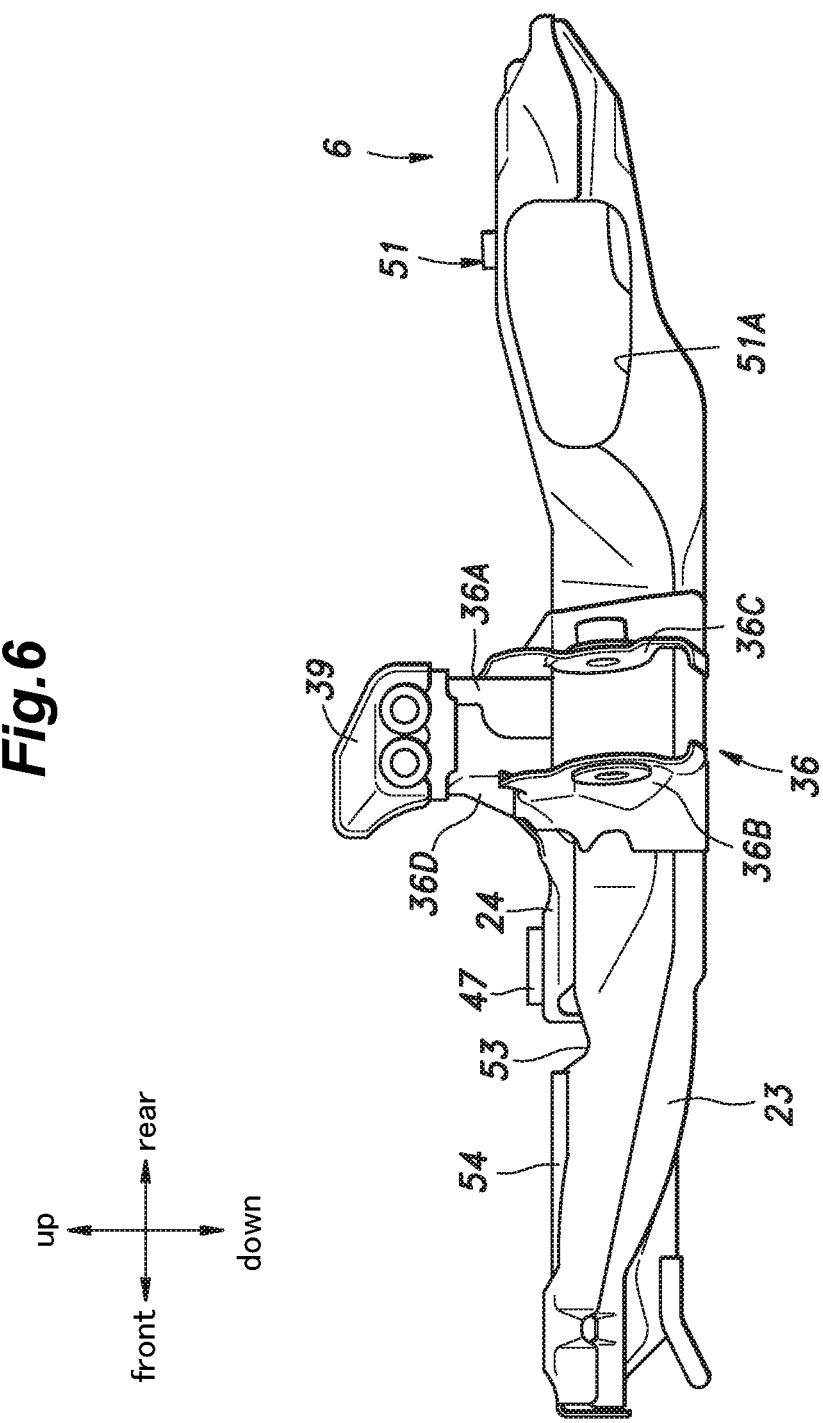
FIG. 6 is a left side view of the front subframe.

As shown in FIGS. 5 and 6, each front longitudinal member 23 is provided, in a part thereof forward of the joint with the front cross member 24, with a deformation promoting portion 53 which has a lower stiffness than the other part of the front longitudinal member 23. The deformation promoting portion 53 is a recess that is formed in the upper surface of the front longitudinal members 23 to be recessed downward. The deformation promoting portion 53 extends laterally from the laterally inner surface to the laterally outer face of the front longitudinal member 23. When a collision load is applied to the front longitudinal member 23 in the fore-and-aft direction, a deformation of the front longitudinal member 23 occurs first at the deformation promoting portion 53, and the front longitudinal member 23 is bent downward at the deformation promoting portion 53.

A reinforcing plate 54 extends along and is attached to a part of the upper surface of each front longitudinal member 23 located forward of the deformation promoting portion 53. A front stabilizer support 56 for rotatably supporting a front stabilizer 55 is provided on each reinforcing plate 54. The front stabilizer 55 is a rod member including a laterally extending portion and left and right end portions that extend rearward from the left and right ends of the laterally extending portion, respectively. The left and right end portions of the front stabilizer 55 are joined to the lower ends of the left and right front shock absorbers 33, respectively, via respective connecting members. Each front stabilizer support 56 is formed with a support hole (not shown in the drawings) through which the laterally extending portion of the front stabilizer 55 is passed. A rubber bushing for supporting the laterally extending portion of the front stabilizer 55 is fitted in the support hole of each front stabilizer support 56. Each front stabilizer support 56 is fastened to the upper surface of the corresponding front longitudinal member 23 by means of multiple bolts. A part of each front longitudinal member 23 on which the reinforcing plate 54 and the front stabilizer support 56 are provided is given a higher stiffness than the other part of the same.

In the following, the effects and advantages of the aforementioned embodiment will be described. The rear lower arm supports 51 are positioned more laterally inward than the respective joints 44 when the rack shaft 42 is in the neutral position (or the steering is neutral). Thereby, the rear lower arm supports 51 can be arranged laterally inward in the vehicle body structure 1. This makes it possible to avoid the interference between the rear lower arm supports 51 and the front wheels 5 so that the steering range of the front wheels 5 can be enlarged.

Also, the front longitudinal members 23 extend obliquely so as to approach each other toward the rear, and the front lower arm supports 36 are positioned more rearward than the steering gearbox 40. Thereby, spaces can be formed on laterally outer sides of the steering gearbox 40 so that the steering range of the front wheels 5 can be enlarged.

Because the rear lower arm supports 51 are positioned more laterally inward than the front lower arm supports 36, the interference between the rear lower arm supports 51 and the front wheels 5 can be avoided even further. Since the laterally outer edge of each front longitudinal member 23 is curved such that the fore-and-aft central part thereof is recessed laterally inward, the distance between the front longitudinal member 23 and the corresponding front wheel 5 can be enlarged so that the interference between the front longitudinal members 23 and the front wheels 5 can be avoided even further. These allow the steering range of the front wheels 5 to be enlarged.

Because the front lower arm supports 36 are arranged at positions overlapping the front cross member 24 in the lateral direction, the lateral force input from each lower arm 31 to the corresponding front lower arm support 36 can be efficiently transmitted to the front cross member 24. Thereby, the deformation of the front longitudinal members 23 can be suppressed, and driving performance and ride comfort of the vehicle can be improved. Also, because the front lower arm supports 36 are joined to the front cross member 24, the lateral force input from each lower arm 31 to the corresponding front lower arm support 36 can be efficiently transmitted to the front cross member 24.

The brace 26 improves the stiffness of the front subframe 6, and therefore, the front subframe 6 is made resistant to deformation under the lateral force transmitted to the front subframe 6 from either lower arm 31. Further, because the rear lower arm supports 51 are positioned on the extension lines obtained by extending the respective rear end portions of the brace 26, the lateral force input from either lower arm 31 can be efficiently transmitted to the brace 26.

Each lower arm 31 is supported by the corresponding front lower arm supports 36 at the arm curved part 31B thereof, and the front knuckle 32 is provided at the tip end of the arm front part 31C extending laterally outward from the laterally outer end of the arm curved part 31B. Therefore, large spaces in which the front wheels 5 are steered can be formed in front of the respective arm front parts 31C.

Since the arm front part 31C has a width larger than those of the arm rear part 31A and the arm curved part 31B, it is possible to improve the stiffness of a part of each lower arm 31 where the largest lateral force from the corresponding front wheel 5 is applied. Also, since the arm curved part 31B is formed such that a front edge thereof has a curvature smaller than a curvature of a rear edge thereof, each lower arm 31 can have a width that increases from the arm rear part 31A to the arm curved part 31B. As a result, the stiffness of the arm curved part 31B is improved, and the lower arm 31 can be made resistant to deformation under the lateral force applied from the corresponding front wheel 5.

Concrete embodiments of the present invention have been described in the foregoing, but the present invention should not be limited by the foregoing embodiments and various modifications and alterations are possible within the scope of the present invention.

The invention claimed is:
1. A vehicle body front structure, comprising:
a front subframe;
a pair of left and right lower arms swingably supported by the front subframe, each lower arm being a part of a corresponding suspension; and
a steering gearbox supported by the front subframe,
wherein the front subframe includes a pair of left and right longitudinal members extending in a fore-and-aft direction, a cross member extending laterally and joined to the longitudinal members, and a front lower arm support and a rear lower arm support provided on each longitudinal member to be spaced from each other in the fore-and-aft direction and swingably supporting the corresponding lower arm, the steering gearbox includes a laterally extending rack shaft and a pair of joints provided at either end of the rack shaft and joined to ends of respective tie rods, the longitudinal members extend obliquely so as to approach each other toward rear, and each front lower arm support is positioned more rearward than the steering gearbox.

2. The vehicle body front structure according to claim 1, wherein in plan view, a front end of each front lower arm support is positioned more forward than a rear end of the cross member, and a rear end of each front lower arm support is positioned more rearward than a front end of the cross member.

3. The vehicle body front structure according to claim 2, wherein each front lower arm support is joined to the corresponding longitudinal member and the cross member.

4. The vehicle body front structure according to claim 2, wherein each lower arm is supported by the corresponding rear lower arm support at a rear end thereof and includes an arm rear part extending from the rear end forward and laterally outward in an oblique manner, an arm curved part that is laterally curved from a front end of the arm rear part, and an arm front part extending laterally outward from a laterally outer end of the arm curved part and supporting a knuckle at a tip end thereof, and each front lower arm support supports the corresponding lower arm at the arm curved part.

5. The vehicle body front structure according to claim 4, wherein the arm front part has a width larger than those of the arm rear part and the arm curved part.

6. The vehicle body front structure according to claim 5, wherein the arm curved part is formed such that a front edge thereof has a curvature smaller than a curvature of a rear edge thereof.

7. The vehicle body front structure according to claim 5, wherein the joint is positioned on an extension line obtained by extrapolating the corresponding arm front part in a lengthwise direction when the rack shaft is in a neutral position.

8. The vehicle body front structure according to claim 1, wherein in plan view, a laterally outer edge of each longitudinal member is curved such that a fore-and-aft central part thereof is recessed laterally inward.

* * * * *